United States Patent [19]

Feigel

[11] Patent Number: 4,638,201
[45] Date of Patent: Jan. 20, 1987

[54] ELECTRONICALLY COMMUTATED DC MOTOR

[75] Inventor: Josef Feigel, Landshut, Fed. Rep. of Germany

[73] Assignee: Standard Elektrik Lorenz Aktiengesellschaft, Stuttgart, Fed. Rep. of Germany

[21] Appl. No.: 834,674

[22] Filed: Feb. 28, 1986

Related U.S. Application Data

[63] Continuation-in-part of Ser. No. 610,160, May 14, 1984.

[30] Foreign Application Priority Data

May 20, 1983 [DE] Fed. Rep. of Germany ....... 3318463

[51] Int. Cl.[4] .................................................. H02K 1/00
[52] U.S. Cl. .................................. 310/216; 310/67 R; 310/68 R; 310/156; 310/194; 310/259; 310/DIG. 6
[58] Field of Search ................. 310/67 R, 42, 46, 194, 310/70 R, 216, 217, 218, 70 R, 70 A, 254, 259, 68 R, 156, DIG 6, 90; 29/596

[56] References Cited

U.S. PATENT DOCUMENTS

| | | | |
|---|---|---|---|
| 1,224,244 | 5/1917 | Wacker | 310/70 R |
| 2,194,046 | 3/1940 | Langer | 310/46 |
| 4,074,157 | 2/1978 | Lace | 310/194 |
| 4,115,715 | 9/1978 | Muller | 310/67 R |
| 4,558,674 | 12/1985 | Glasauer | 310/156 |

Primary Examiner—R. Skudy
Attorney, Agent, or Firm—T. L. Peterson; J. M. May

[57] ABSTRACT

An electronically commutated dc motor having a dome-shaped external rotor and a stator having a double-T-shaped design with the stator consisting of one yoke stack disposed asymmetrically in relation to the longitudinal stator axis and of two pole stacks of which each is provided with an extension on the same side in the longitudinal direction. In the circumferential direction the extensions are provided with lugs.

16 Claims, 9 Drawing Figures

ELECTRONICALLY COMMUTATED DC MOTOR

This application is a continuation-in-part of the U.S. patent application Ser. No. 610,160 filed on May 14, 1984.

BACKGROUND OF THE INVENTION

1. Field of the Invention

The invention relates generally to motors and more particularly to an electronically commutated direct current motor which generates adequate starting torque.

2. Description of the Prior Art

These types of motors, which are described for example in the German patent application No. P 33 14 239.4 (Glasauer et al, now U.S. Pat. No. 4,558,245) are single-stranded coil type two pulse current supplied, commutatorless and permanently energized direct current (dc) motors having an external rotor. Upon supplying the stator winding with current, the dc motors are capable of being restarted automatically from the standstill if only a small braking torque exists at the motor shaft. The supply of current to the stator winding is effected in these types of dc motors in dependence upon the rotational position of the rotor. The rotor position is ascertained by a sensor, such as a Hall generator, with a signal obtained from the sensor utilized to control an electronic circuit which applies a source of direct current voltage to the stator winding for forming the required starting torque. In these types of dc motors aided by the electronically controlled stator winding, a stator alternating current field is provided which in cooperation with the exciting field of the permanent magnet, forms a pulsating moment. In cases where both the polar axis of the permanent magnet and the polar axis of the alternating current field are not displaced with relation to one another, the starting torque equals zero. Under these conditions, the rotor is prevented from starting on its own. The forming of a starting torque requires an angle differing from zero to exist between the polar axis of the permanent magnet and the polar axis of the stator alternating current field. This means that in the case of a currentless stator winding, the polar axis of the permanent magnet must be displaced by a certain angle of rotation with respect to the polar axis of the stator alternating current field.

In the dc motor proposed in the German patent application No. P 33 14 239.4 (now U.S. Pat. No. 4,558,245), the necessary displacement (twist) of the rotor with respect to the stator when the motor is in the rest position is realized in that each pole stack is provided on the same side with an extension extending in the circumferential direction. Therefore, to the rotor, the stator offers a non-constant magnetic resistance along the circumference of the stator. In the rest position of the motor, the rotor assumes such a position with respect to the stator that an angle differing from zero is formed between the longitudinal stator axis and the polar axis of the permanent magnet. For assuring the reliable starting of the dc motor, it is required for the rotor to have only one rest position. In the case of the dc motor as proposed in the aforementioned German patent application No. P 33 14 239.4 (now U.S. Pat. No. 4,558,245), it is possible that the rotor can assume a second rest position from which the dc motor is not capable of automatically starting.

SUMMARY OF THE PRESENT INVENTION

It is therefore an object of the present invention to provide an improved electronically commutated dc motor having a single defined rest position.

Briefly, a preferred embodiment of the present invention includes an electronically commutated direct current motor comprising a permanent magnet rotor which consist of a dome-shaped body of magnetizable material and of a permanent magnet disposed on an inner circumference thereof. Further, a stator is included having a winding providing an alternating current field. The stator is fashioned into a double-T-shaped design having a common leg about which the stator winding is disposed. The stator also includes a yoke stack and a plurality of two pole stacks and is provided with a plurality of stator windings disposed asymmetrically in relation to a longitudinal stator axis. The pole stacks are designed such that a constant air gap is formed between the stator and rotor. Each pole stack is provided with an extension on the same side in the circumferential direction and the stator windings are wound onto a respective coilform which is disposed on the yoke stack. Each of the extensions is provided with a lug at one end thereof for projecting the extension further in the circumferential direction providing a single defined rest position.

An advantage of the dc motor of the present invention is that the electronically commutated dc motor has a single defined rest position.

These and other objects and advantages of the present invention will no doubt become obvious to those of ordinary skill in the art after having read the following detailed description of the preferred embodiment which is illustrated in the various drawing figures.

IN THE DRAWING

Further advantageous embodiments of the invention are set forth in the subclaims and are explained hereinafter with reference to some embodiments shown in FIGS. 1 to 7 of the accompanying drawings, in which;

DETAILED DESCRIPTION OF THE PREFERRED EMBODIMENT

Figure 1:
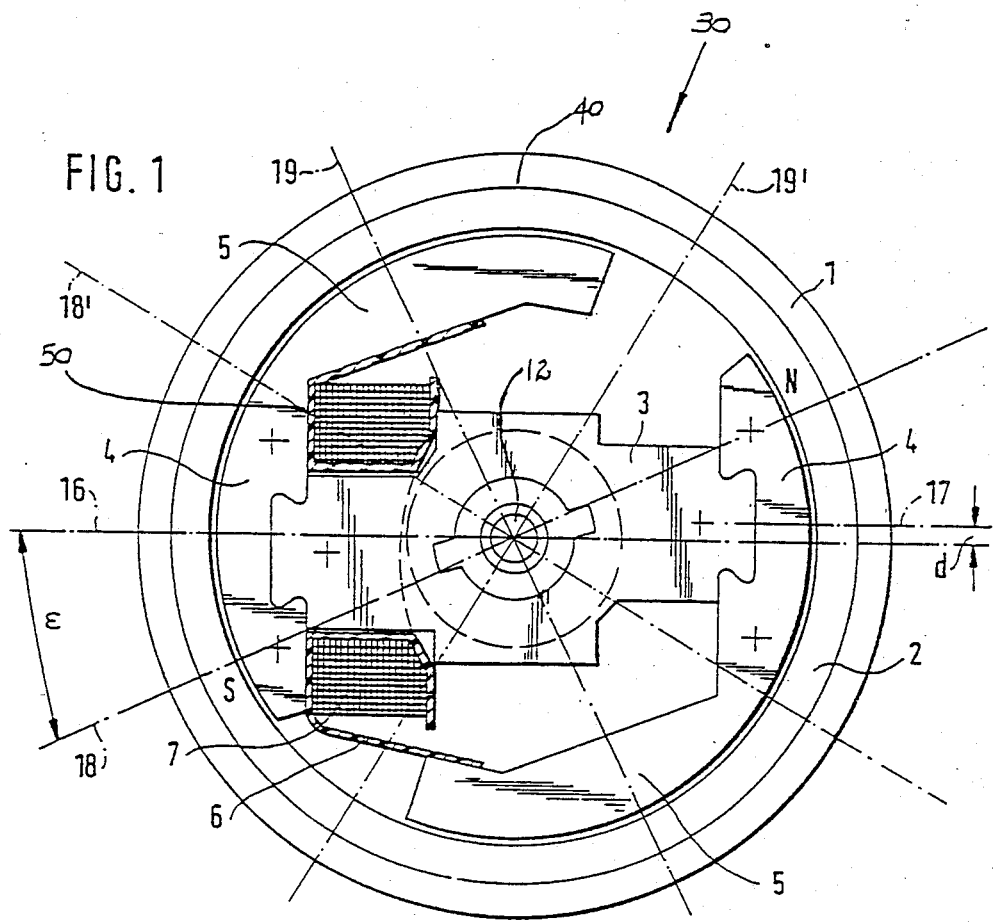
FIG. 1 is an end view of both the rotor and stator of a novel dc motor according to the present invention.

FIG. 1 shows a rotor 40 and a stator 50 of a novel dc motor 30 as seen from one end face after both a mounting flange 9 (FIG. 3) and a printed circuit board 10, containing an electronic circuit required for the commutation, have been removed. The illustrated dc motor 30 is a bipolar external rotor type of motor. The rotor 40 includes a dome-shaped body 1 of magnetizable material, such as soft iron, on the inner circumference of which a permanent magnet 2, such as a plastics bound plate-shaped permanent magnet is inserted and magnetized with the polarity as indicated and mounted on a rotor shaft 12. The dome-shaped body 1 can be more clearly described as a asymmetrical pot or a cylindrical cup.

The stator 50 includes three lamination-stack parts, namely a yoke stack 3 and a plurality of two pole stacks 4 which are in a form-fit connection with one another owing to the employment of dovetailed fitting units. Each of the pole stacks 4 not only has the shape of a mushroom cap as previously known from double-T-rotor windings, but each pole stack 4 is provided on the same side in the circumferential direction, with an extension 5 (see FIG. 2) which, in the given example of the preferred embodiment, mechanically extends over about 70 angular degrees, so that each pole stack 4 mechanically extends over approximately 150 angular degrees. The yoke stack 3 carries a plurality of coil-forms 6 with a plurality of stator windings 7. (In FIG. 1 there is only shown one coilform 6 and one stator winding 7.) As is moreover evident from FIG. 1, the motor 30 has a longitudinal stator axis 16 which is the longitudinal axis of symmetry through the motor 30. Note that the stator windings 7 are disposed asymmetrically in relation to the longitudinal stator axis 16. The stator alternating current field includes a polar axis 17 which is staggered parallel in relation to the longitudinal stator axis 16 by the space d. The permanent magnet 2 within the rotor 40 includes a polar axis 18. At a right angle to the polar axis 18, there is a neutral zone 19. In FIG. 1, the polar axis 18 of the permanent magnet 2 is shown in the position which it assumes when the stator winding 7 is not supplied with current. In that case, the polar axis 18 of the permanent magnet 2 is displaced by an angle $\epsilon$ with respect to the polar axis 17 of the stator alternating current field.

As mentioned herein, when the rotor 40 of the dc motor 30 shown in FIG. 1 is in the rest position, the rotor 40 may be prevented from assuming the rest position as defined by the polar axis 18 of the permanent magnet 2. The failure of the rotor 40 to assume the rest position as defined by the polar axis 18 is due to a second relative minimum of the magnetic energy of the motor 30. Instead, the rotor 40 may assume a position deviating from polar axis 18 which is indicated by a polar axis 18' shown in FIG. 1. When the rotor 40 has assumed the position of polar axis 18', then the neutral zone 19 of the rotor 40 is likewise displaced to a neutral zone 19'.

Figure 2:
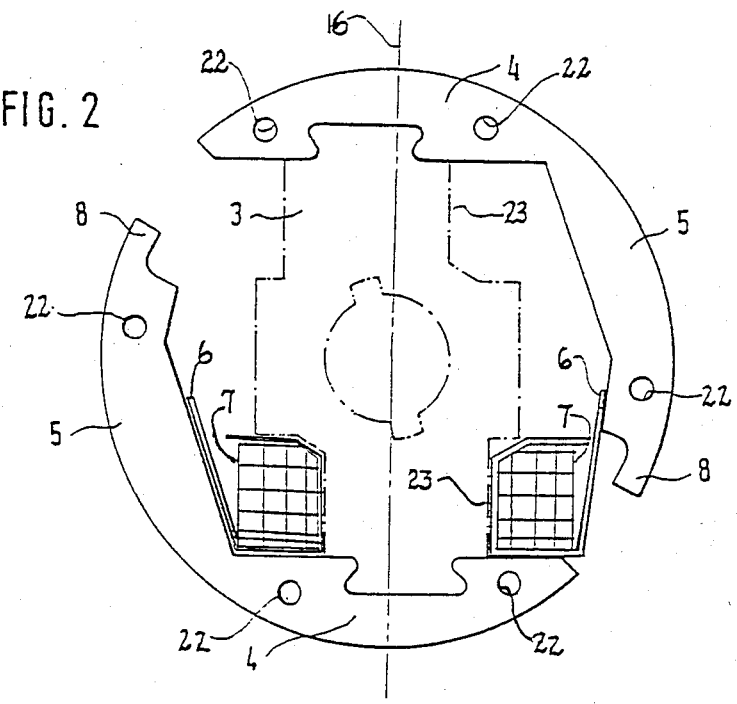
FIG. 2 illustrates a design of the stator lamination stack of the dc motor of FIG. 1.
Figure 6:
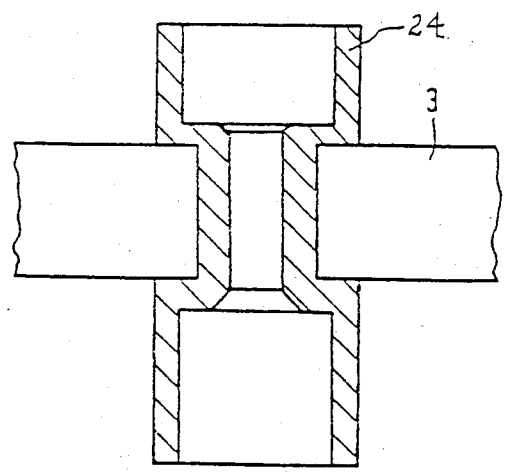
FIG. 6 is a sectional elevation of the rotor bearing.

FIG. 2 again illustrates the design of the stator 50 consisting of the yoke stack 3 and of the pole stacks 4. In the manner known per se, the sheet steel laminations of the pole stacks 4 are held together by means of a plurality of rivets 22 whereas the sheet steel laminations of the yoke stack 3 are held together by a bearing support 24 as seen in FIG. 6. The bearing support 24, for example, can be pressure-cast in one piece. FIG. 2 also shows that a plurality of legs 23 of the yoke stack 3 which carry the coilforms 6 and the stator windings 7 are asymmetrical in relation to the longitudinal stator axis 16. FIG. 2 further illustrates the means for ensuring that the rotor 40 will always assume only a single defined rest position when the stator windings 7 are not being supplied with current. The single rest position is defined by the polar axis 18. The extensions 5 of the stator 50 which consist of the yoke stack 3 and of the pole stacks 4 are shown further extended by a plurality of lugs 8 with a single lug 8 being connected to each extension 5. The function of the stator pole stack extensions 5 in the instant invention is to exhibit a value of magnetic resistance which permits the neutral zone 19 of the rotor 40 to be aligned along the extensions 5 when the stator 50 is currentless which causes the polar axis 18 of the permanent magnet rotor 40 to be displaced by the angle epsilon $\epsilon$ from the polar axis 17 of the stator alternating current field for providing an optimal motor starting torque. The function of the plurality of lugs 8 is that one of the lugs 8 is connected to an end of one of the pole stack extensions 5. Each of the pole stack extensions 5 with one of the plurality of lugs 8 attached thereto with each lug 8 pointing in a common direction permits each of the pole stack extensions 5 to project further along a circumferential direction of the plurality of pole stacks 4. This structure provides a single defined rest position for the rotor 40 when the stator windings 7 are currentless. Further, this structure provides a non-constant magnetic resistance to the rotor 40 along the circumference of the stator 50 contributing to the non-zero angle epsilon $\epsilon$ and the single defined rest position of the rotor 40. As is generally well known, when the stator windings 7 are currentless, the rotor 40 always assumes that particular rotational position in which the magnetic resistance is at a minimum. The single defined rest position of the rotor 40 is located at this minimum magnetic resistance position where the longitudinal stator axis 16 and the polar axis 18 of the permanent magnet 2 form the angle epsilon $\epsilon$ between them. Thus, when the rotor 40 is at rest and the stator 50 is deenergized, the starting torque of the direct current motor 30 is optimal to overcome the braking torque at the motor shaft 12. By employing the plurality of lugs 8, it is assured that the rotor 40 will always assume only the single rest position which is defined by the polar axis 18.

Figure 3:
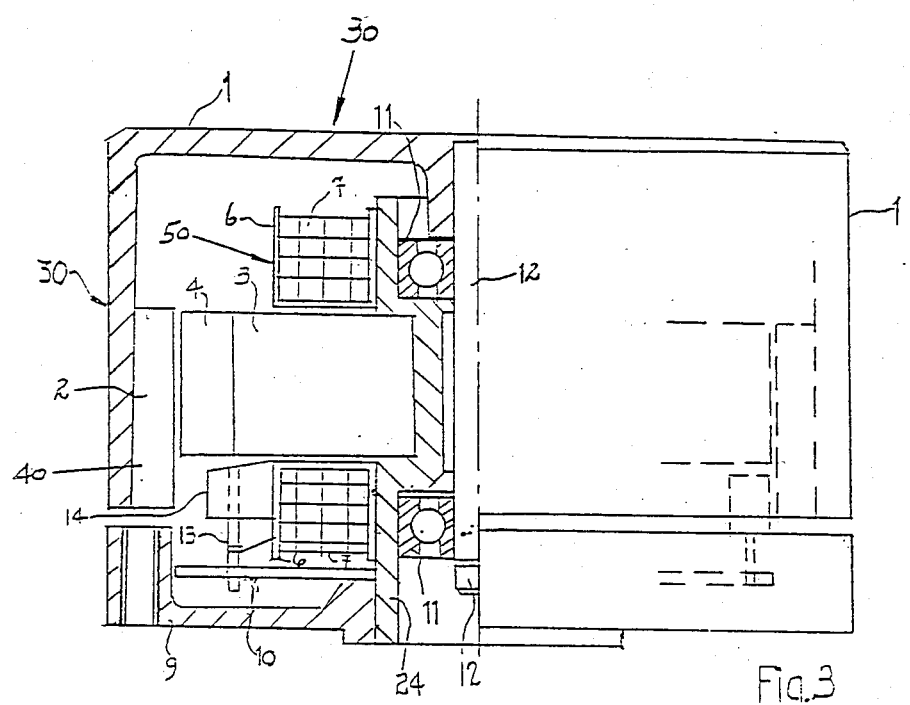
FIG. 3 is a partial sectional elevation taken through the dc motor of FIG. 1.

As can be recognized from FIG. 3, the stator 50 is mounted in the sleeve-shaped bearing support 24 which is connected to the mounting flange 9 which carries the printed circuit board 10 with the electronic circuit. Inside the bearing support 24 are a plurality of ball bearings 11 which support a rotor shaft 12. However, rotor shaft 12 may also be supported by other types of bearings, such as sintered spherical bearings. FIG. 3 of motor 30 further illustrates in elevation the dome-shaped body 1, the permanent magnet 2, the yoke stack 3, the plurality of pole stacks 4, the plurality of coilforms 6, the plurality of stator windings 7, the soldering pin 13, the lug joining piece 14 and the bearing support 24.

Figure 4:
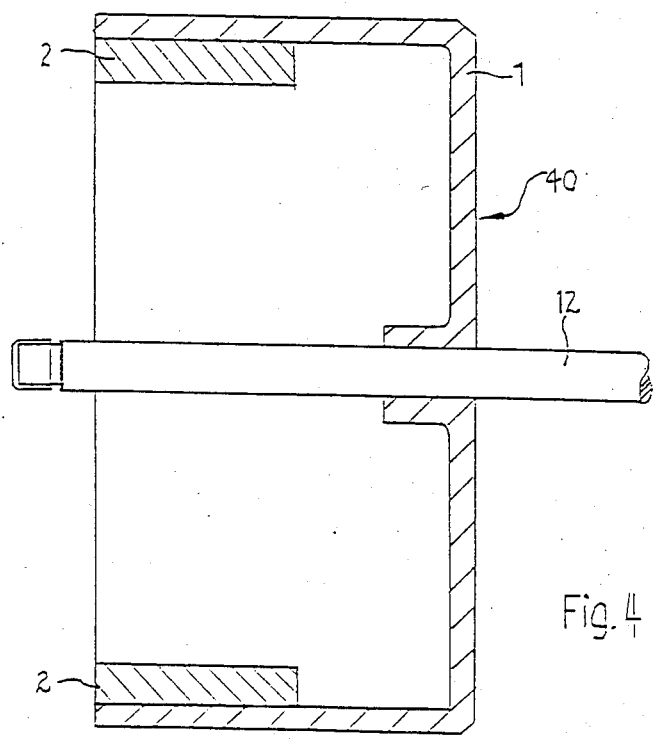
FIG. 4 is a sectional elevation of the rotor.

FIG. 4 shows the rotor 40 consisting of the dome-shaped body 1, the permanent magnet 2 and the rotor shaft 12.

Figure 5A:
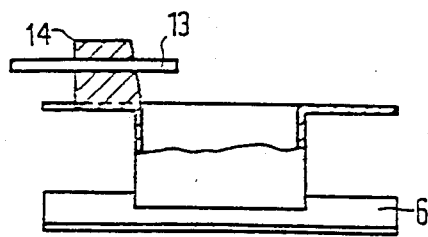
FIGS. 5a to 5c illustrate different views of the coilform for taking up the stator winding.
Figure 5B:
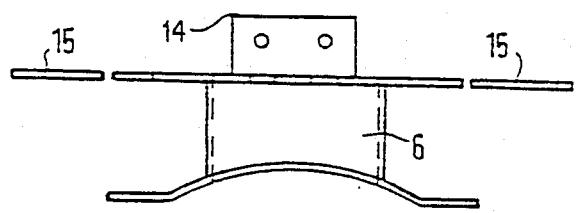
Figure 5C:
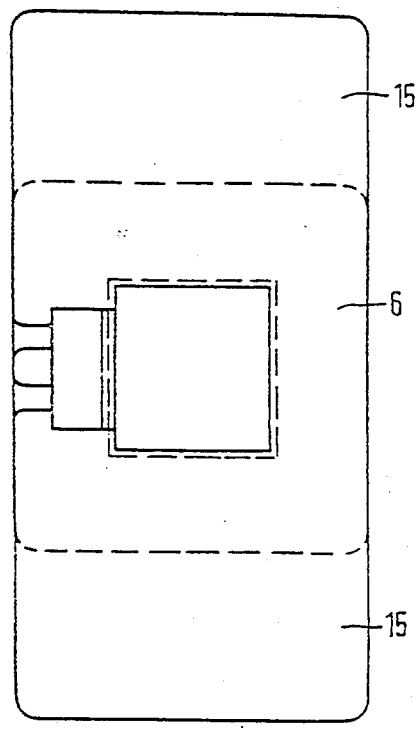

FIGS. 5a through 5c show various views of the coilform 6. Two perculiarities of the coilform 6 are recognizable. The first is seen in a plurality of soldering pins 13 which are provided for in a joining piece 14 of the coilform 6. To a first end of the projecting soldering pins 13 there may be connected the ends of the stator winding 7, and to a second end of the soldering pins 13 there may be connected the conductors of the printed circuit board 10 in an electricallly conducting manner. (See FIG. 5a) The second peculiarity resides in a plurality of flaps 15 of the coilform 6 which are turned onto the stator winding 7 during the assembly of the motor 30 (see FIGS. 5b and 5c).

Figure 7:
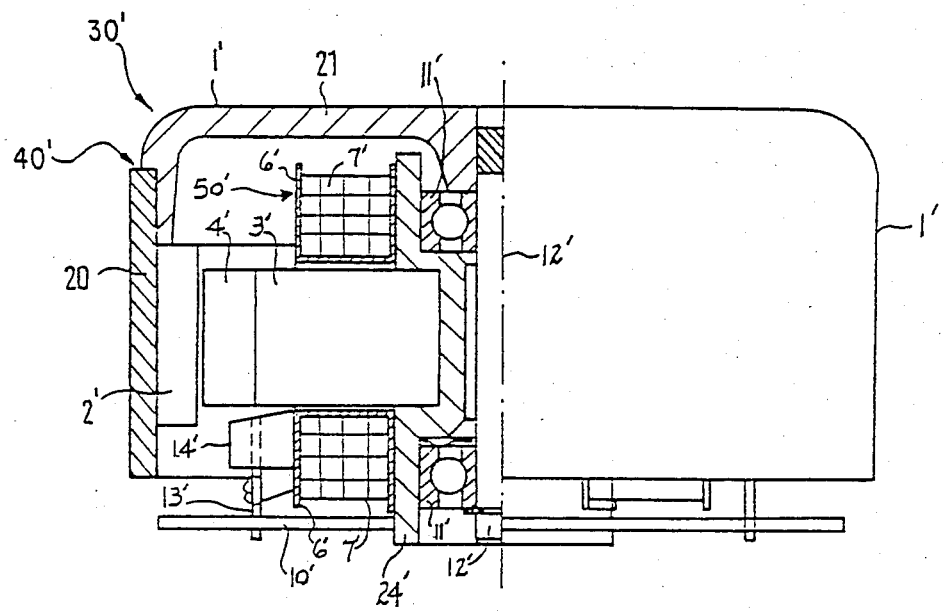
FIG. 7 shows a dc motor comprising a different type of rotor.

In an alternative embodiment of the motor 30' as shown in FIG. 7 (in which elements duplicate to those employed in the preferred embodiment are identified by a prime designation), the rotor 40' differs in that the dome-shaped body 1' consists of a cylinder 20 and of a bottom 21. The cylinder 20 represents the magnetic yoke of the permanent magnet 2', and thus it must be made of a magnetizable material. The bottom 21, however, can be made of a non-magnetizable material, such as of plastics or of pressure-case aluminum. Also illustrated is the yoke stack 3', the plurality of pole stacks 4', the plurality of coilforms 6', the plurality of stator windings 7' of the stator 50'; the printed circuit board 10', the ball bearings 11', the rotor shaft 12', the soldering pin 13', the lug joining piece 14' and the bearing support 24'.

The novel dc motor 30 has improved starting properties because the addition of lugs 8 to the extensions 5 defines a single rest position of the rotor 40. The lugs 8 provide a favorable magnetic resistance value within the extensions 5 so that the neutral zone 19 of the rotor 40 aligns along the extensions 5 in the single rest position of motor 30 when the stator windings 7 are currentless. This results in the angle $\epsilon$ which is optimal with respect to the torque formation so that a reliable starting of the motor 30 is always provided. Moreover, the novel dc motor 30 consists of simple design parts which can be partially manufactured and/or assembled with the aid of automatic machines.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electronically commutated direct current motor comprising, in combination:
    a direct current motor including a rotor having a dome-shaped body comprised of magnetizable material having a permanent magnet disposed on an inner circumference of said dome-shaped body, said rotor being a bipolar external rotor;
    a stator located within said permanent magnet and including a yoke stack and a plurality of pole stacks and further including a longitudinal stator axis providing a longitudinal axis of symmetry through said motor;
    a plurality of coilforms carried by said yoke having a plurality of stator windings wound on said coilforms, said stator winding for providing an alternating current field, said stator having a double T-shaped design with said stator winding being disposed on a common leg of said double T-shaped stator, said pole stacks and said yoke stack with said stator windings wound thereon being disposed asymmetrical to said longitudinal stator axis;
    a plurality of stator pole stack extensions projecting in the same circumferential direction and separated from said permanent magnet by a constant air gap, said air gap located between said stator and said rotor, said stator alternating current field having a polar axis staggered parallel to said longitudinal stator axis by a fixed distance and said rotor permanent magnet having a polar axis orthogonal to a rotor neutral zone and displaced from said stator alternating current polar axis by a non-zero angle epsilon when said stator winding is currentless;
    a rotor shaft penetrating said dome-shaped body for turning an external load;
    a printed circuit board mounted adjacent to said coilform and supported by a mounting flange within said dome-shaped body, said printed circuit board having an electronic circuit for providing commutation of an input signal; and
    a plurality of lugs connected to said plurality of stator pole stack extensions, each of said pole stack extensions including one of said plurality of lugs for further projecting each of said pole stack extensions along a circumferential direction of said plurality of pole stacks for providing a single defined rest position for said rotor when said stator windings are currentless and wherein said plurality of lugs connected to said plurality of stator pole stack extensions provides a non-constant magnetic resistance to said rotor along the circumference of said stator creating said non-zero angle epsilon and said single defined rest position of said rotor when said stator winding is currentless for providing an optimal starting torque for said direct current motor.

2. The electronically commuted direct current motor of claim 1 wherein said single defined rest position of said rotor is parallel to said polar axis of said rotor permanent magnet.

3. The electronically commutated direct current motor of claim 2 wherein said permanent magnet comprises a plastics bound plate-shaped permanent magnet.

4. The electronically commutated direct current motor of claim 3 wherein said magnetizable material of said dome-shaped body comprises soft iron.

5. The electronically commutated direct current motor of claim 4 wherein said yoke and said plurality of pole stacks each are dovetailed fitting for providing a form-fit connection.

6. The electronically commutated direct current motor of claim 5 further including a plurality of soldering pins mounted within a joining piece of said coilform for electrically connecting said stator windings to said printed circuit board.

7. The electronically commutated direct current motor of claim 6 wherein said coilform further includes a plurality of flaps for turning onto said stator winding during assembly of said motor.

8. The electronically commutated direct current motor of claim 7 wherein said stator is mounted in a sleeve-shaped bearing support connected to said mounting flange.

9. The electronically commutated direct current motor of claim 8 wherein said bearing support includes a plurality of ball bearings for supporting said rotor shaft.

10. The electronically commutated direct current motor of claim 8 wherein said bearing support includes a plurality of sintered spherical bearings for supporting said rotor shaft.

11. The electronically commutated direct current motor of claim 9 wherein said pole stacks include a plurality of sheet steel laminations, said pole stack sheet steel laminations being coupled by a plurality of rivets.

12. The electronically commutated direct current motor of claim 11 wherein said yoke includes a plurality of sheet steel laminations, said yoke sheet steel laminations being coupled by said bearing support.

13. The electronically commutated direct current motor of claim 12 wherein said bearing support is pressure cast into a single piece.

14. The electronically commutated direct current motor of claim 13 wherein said yoke further includes a plurality of legs for supporting said plurality of coilforms.

15. The electronically commutated direct current motor of claim 14 wherein said plurality of soldering pins each have a first end and a second end, said first end for connecting to a first terminal connector located on said stator windings and said second end for connecting to a second terminal connector located on said printed circuit board.

16. An electronically commutated direct current motor comprising, in combination:

said direct current motor including a rotor having a dome-shaped body with a permanent magnet disposed on an inner circumference of said dome-shaped body, said dome-shaped body further comprised of a cylinder and a bottom, said cylinder comprised of a magnetizable material and being a magnetic yoke for said permanent magnet, said bottom being comprised of a non-magnetizable material;

a stator located within said permanent magnet and including a stator yoke and a plurality of pole stacks and further including a longitudinal stator axis providing a longitudinal axis of symmetry through said motor;

a plurality of coilforms carried by said stator yoke having a plurality of stator windings wound on said coilforms, said stator windings fror providing an alternating current field, said stator having a double T-shaped design with said stator winding being disposed on a common leg of said double T-shaped stator, said pole stacks and said stator yoke with said stator windings wound thereon being disposed asymmetrical to said longitudinal stator axis;

a plurality of pole stack extensions projecting in the same circumferential direction and separated from said permanent magnet by a constant air gap located between said stator and said rotor, said stator alternating current field having a polar axis staggered parallel to said longitudinal stator axis by a fixed distance and said rotor permanent magnet having a polar axis orthogonal to a rotor neutral zone and displaced from said stator alternating current polar axis by an angle epsilon when said stator winding is currentless;

a rotor shaft penetrating said dome-shaped body for turning an external load;

a printed circuit board mounted adjacent to said coilform and having an electronic circuit for providing commutation of an input signal;

a plurality of lugs connected to said plurality of pole stack extensions, each of said pole stack extensions including one of said plurality of lugs for further projecting each of said pole stack extensions along a circumferential direction of said plurality of pole stacks for providing a single defined rest position for said rotor when said stator windings are currentless and wherein said plurality of lugs connected to said plurality of pole stack extensions provides a non-constant magnetic resistance to said rotor along the circumference of said stator creating said non-zero angle epsilon and said single defined rest position of said rotor when said stator winding is currentless for providing an optimal starting torque for said direct current motor.

* * * * *